United States Patent [19]
Sues et al.

[11] Patent Number: 5,229,648
[45] Date of Patent: Jul. 20, 1993

[54] MULTI ELEMENT SECURITY SYSTEM

[75] Inventors: John M. Sues; Jing H. Sun, both of New York, N.Y.

[73] Assignee: Autosafe International, Inc., New York, N.Y.

[21] Appl. No.: 637,353

[22] Filed: Jan. 4, 1991

Related U.S. Application Data

[63] Continuation-in-part of Ser. No. 392,092, Aug. 10, 1989, abandoned.

[51] Int. Cl.$^5$ .......................... B60R 25/00; G06F 7/04
[52] U.S. Cl. .................................. 307/10.2; 180/287; 340/825.31
[58] Field of Search ............... 307/10.4, 10.5, 10.2, 307/10.3, 10.1, 10.6, 9.1; 361/172; 370/85.1; 180/287; 70/278, 264, 241, DIG. 46; 340/825.31, 825.3, 825.32, 825.34, 825.54, 572

[56] References Cited

U.S. PATENT DOCUMENTS

| | | |
|---|---|---|
| 4,192,400 | 3/1980 | McEwan .............................. 180/287 |
| 4,300,057 | 11/1981 | Batlle Crosas ..................... 180/287 |
| 4,642,631 | 2/1987 | Rak ...................................... 361/172 |
| 4,688,036 | 8/1987 | Hirano et al. ...................... 307/10.5 |
| 4,758,835 | 7/1988 | Rathmann et al. ............. 340/825.31 |
| 4,789,859 | 12/1988 | Clarkson et al. ..................... 70/278 |
| 4,819,050 | 4/1989 | Manzoni .............................. 307/10.2 |
| 4,928,098 | 5/1990 | Dannhaeuser ................. 340/825.31 |
| 5,055,701 | 10/1991 | Takeuchi ............................. 307/10.2 |
| 5,124,565 | 6/1992 | Yoshida et al. ................ 340/825.31 |

OTHER PUBLICATIONS

Bushnell, Automatic I.D. News (Feb. 1988), Ames, Perspective in Radio Frequency Identification (Van Nostrand-Reinhold—Publ. 1990).
Schwind—Material Handling Engr. (Sep. 1987), Ames, Perspectives in Radio Frequency Identification (Van Nostrand-Reinhold—Publ. 1990).
Ames, (Apr. 1989), Ames, Perspectives in Radio Frequency Identification (Van Nostrand-Reinhold—Publ. 1990).

*Primary Examiner*—A. D. Pellinen
*Assistant Examiner*—Richard T. Elms
*Attorney, Agent, or Firm*—M. Lukacher

[57] ABSTRACT

A security system is provided for a mobile piece of equipment such as a freight car, aircraft, boat, automotive/truck vehicle, or other machine that may be stolen. The system consists of a central processing unit, transporting a stream of data to various components of the vehicle, and component control units attached to each of the parts of the vehicle being protected. The control units accept a code from the memory of the vehicle ignition key, alter the code, and transmit the altered code back to the CPU. The operation of certain devices that effect the operation of the vehicle and/or its protected subsystems are also disabled. These systems in turn may be linked to a central database via a system control center to control the inventory and regulation of parts both within each vehicle and between all vehicles protected by the system.

7 Claims, 4 Drawing Sheets

FIG. 5

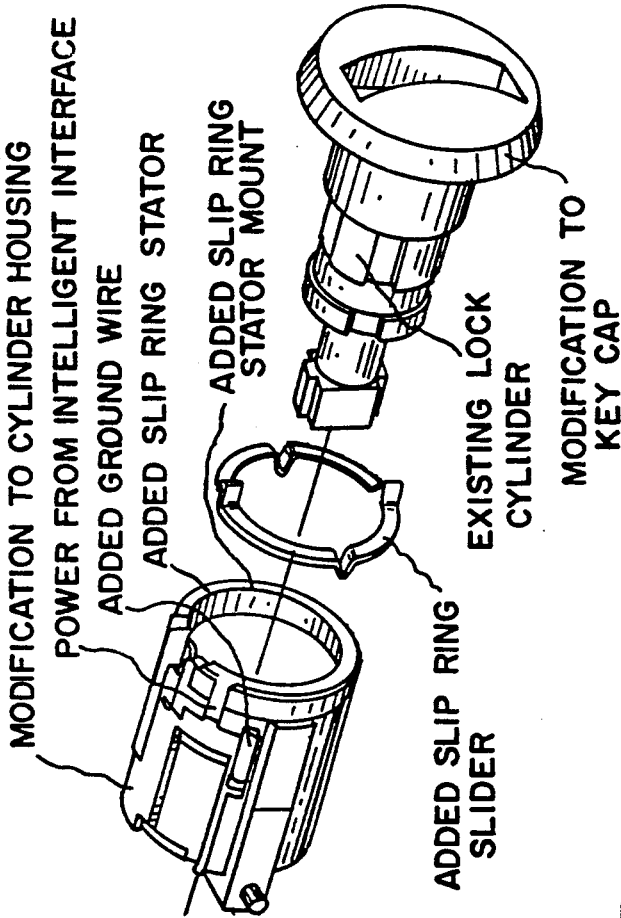
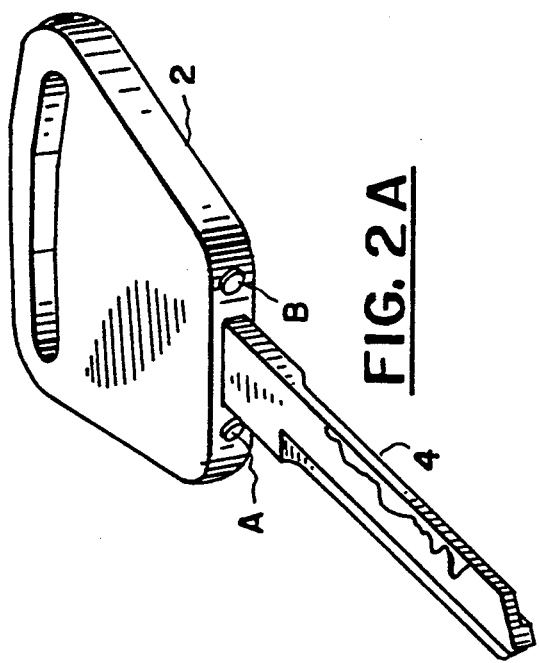
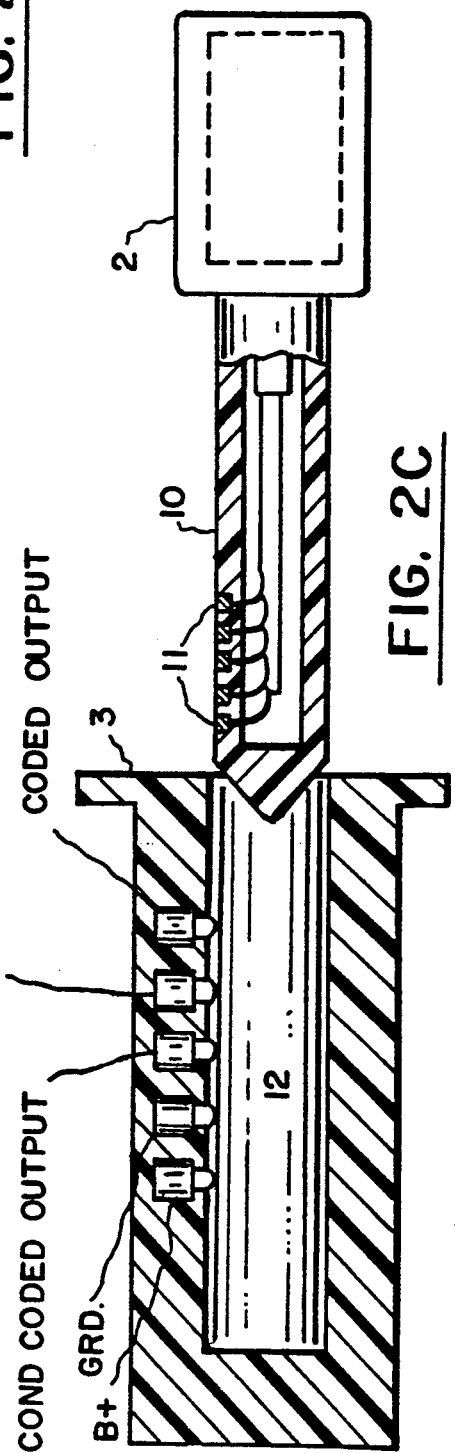

MULTI ELEMENT SECURITY SYSTEM

BACKGROUND OF THE INVENTION

This application is a continuation-in-part of U.S. Ser. No. 392,092, filed Aug. 10, 1989 and now abandoned, the contents of which are hereby incorporated by reference.

Theft and unauthorized use of mobile pieces of equipment such as motor vehicles, construction equipment, aircraft and the like, is widespread. Although numerous attempts in the past have been utilized to curtail such theft and unauthorized use, they have generally met with limited success. Accordingly, there has been a long felt need in the art for a security system which provides an efficient deterrent to such crimes.

The security systems presently available do not provide an efficient deterrent to theft of component parts. Alarm systems such as horns, beepers or sirens have little effect in deterring thieves. In urban areas especially, the presence of sirens and alarms has become so common as to be ineffective. Radio signaling systems are likewise ineffective because they rely on the speed and efficiency of the local police departments. Today, many police departments are understaffed and unable to apprehend a thief before the radio signaling system can be disabled. A proliferation of such a system can only exacerbate the problem.

Although anti-theft systems which utilize an electronic key to secure a motor vehicle have been described in the past, none have provided an effective means of protection. One such security system is described in U.S. Pat. No. 4,192,400, issued to John A. McEwan on Mar. 11, 1980. McEwan discloses a key which contains a shift register that when inserted into the motor vehicle causes an electronic clock to redial the data stored in the shift register. A comparison device then compares that data with data previously stored in the vehicle. If a match is found, the vehicle is usable. However, if the data does not match, the distributor or starter motor of the vehicle is disabled.

U.S. Pat. No. 4,642,631, issued to Stanley C. Rak on Feb. 10, 1987, describes an interactive security system in which a first circuit produces a control signal, and a second circuit produces a code word representative of a sequence of logic states, with the logic states sequence being a function of the control signal. A comparison circuit compares the signals produced to a predetermined stored signal, and if an match is found, access to a vehicle or other device is provided.

Similar security systems are described in U.S. Pat. Nos. 4,300,057, 4,370,561, 4,383,242, 4,538,135, 4,672,224 and 4,676,082.

The above described security systems have several disadvantages. For example, all such security systems can be destroyed and the mobile equipment can be transported to a remote location, repaired and resold. Alternatively, the mobile equipment can be dismantled and the various parts sold separately. It is also well known that body parts i.e. trunk lids, hoods front fenders, as well as viable subsystems such as radios, recording devices, audio telephones, or other electronic devices, may be completely unprotected by a particular security system, and thus, can be removed and resold.

Lastly, through the use of a central data base, changes in registration, replacement of parts, major repairs, accidents, as well as a vehicle's complete service record may be recorded. It is the purpose of this system to render the vehicle and its components worthless for resale and unmarketable by unauthorized persons. The data base accounts for every protected part of the entire production of a particular model type motor vehicle. If a particular protected part, such as a left front fender, is removed from one vehicle and installed in another, neither vehicle would operate. The removed part could not be placed in any vehicle in the entire production run, rendering it worthless to the unauthorized user. This provides the additional advantage of enabling compilation of marketing and quality assurance information that can be used by a dealer or manufacturer. In summary, the subject invention provides not only a security system, but also a comprehensive system for planned maintenance of a vehicle and its parts, as well as an accurate inventory mechanism and marketing information.

SUMMARY OF THE INVENTION

The subject invention provides a security system for a mobile piece of equipment which comprises a component control unit (CCU), a central processing unit (CPU), a system control center (SCC), and an international control database (IDB). The CCU, and the CPU reside in the protected vehicle, the SCC resides at the authorized dealer/agent premises and the IDB resides with the manufacturer, but all are essential to the operation of the system.

There are two types of CCUs: 1) passive, is associated with a selected component of a piece of equipment. The CCU has means for receiving and storing data which has been entered during the manufacturing process, and by the SCC which can be entered by the authorized dealer/agent or by the factory database. Each CCU has a factory code, (FAC), for the protected part, which may not be changed during the lifetime of the protected part. This code can not be altered by the SCC as the code is set by the factory data base. 2) active, having the same memory capability as the passive CCU, additionally being able to disable the part it protects. The CPU receives data from the ignition key and sends it to the CCUs which alter the data received, transmitting the altered data back to the CPU.

The CPU is located within the mobile piece of equipment and has means for polling each of the component control units in proper sequence, and means for verifying codes or altered codes received from the component control unit. If there are codes that are incorrect, out of sequence, or missing, the CPU will instruct the active CCUs to disable their parts.

The SCC is capable of entering data in the memory of the CPU and relating such information to a central database.

The IDB is capable of correlating and keeping an inventory of information received from the SCC such as authorizing code changes in the CPUs and CCUs memory. The IDB can read both the ROM and EProm memory of the CCUs whereas the SCC's access is limited to the EPROM.

BRIEF DESCRIPTION OF THE FIGURES

FIG. 2A—Illustrates an electronic key useful for engaging the subject invention.

FIG. 2B—Illustrates the key recognition subsystem.

FIG. 2C—Illustrates an alternative key and key recognition subsystem.

DETAILED DESCRIPTION OF THE INVENTION

Figure 1:
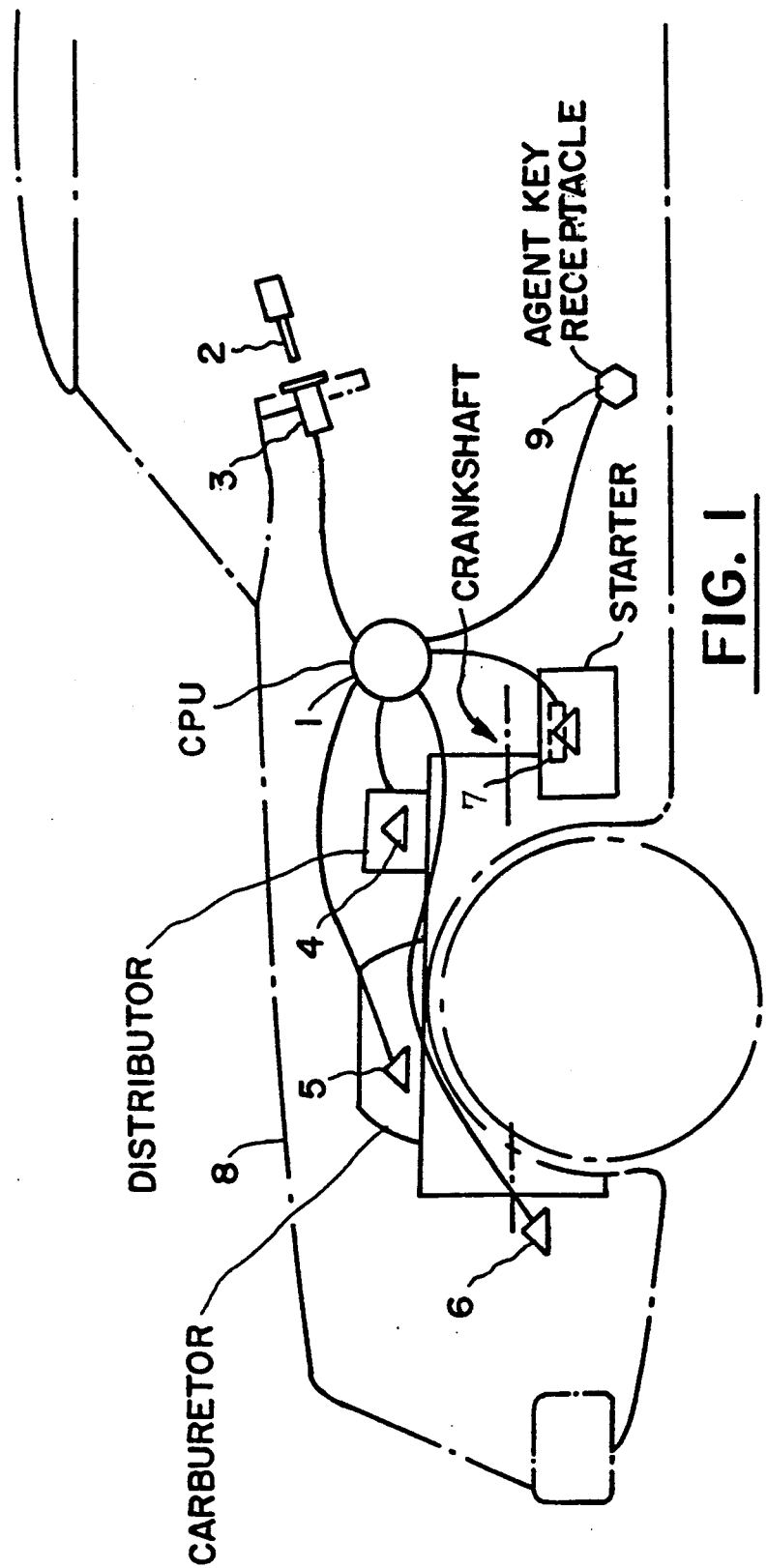
FIG. 1—Illustrates a motor vehicle with a vehicle disabling portion of the subject system installed.

The subject application uses the term "vehicle" in describing the subject invention. However, the term "vehicle" is not intended to limit the invention to vehicles per se, but rather the invention is applicable to all mobile pieces of equipment.

The subject invention comprises three major systems, each having numerous subsystems. The three major systems are:
(1) the vehicle disabling system,
(2) the Dealer/Agent equipment, and
(3) the central data base.

The vehicle disabling system is comprised of one or more component control units (CCU) and a central processing unit (CPU) which communicate with each other. Typically, the system comprises multiple CCUs. Some are passive and others active that are installed at inaccessible locations within a protected component. All CCUs contain a memory for storing data that can be accessed by the CPU. One function of the CPU is to verify signature codes and sequence of coded protected parts. CPU commands to active CCUs can disable the part or system to which they are attached. The CPU would send such a command if after the polling function one or more signature codes are incorrect, missing or out of sequence.

Autosafe can determine if protected parts are disconnected from the system. If a protected part is disconnected, the vehicle will not operate until approval is received from the data base. In the event the protected part becomes disconnected accidentally, the system has a manual override, activated by a code from a keypad in the vehicle that allows a predetermined number of starts. This procedure allows the vehicle to operate until it is returned to an authorized dealer/agent for code refreshing.

The CPU communicates with each protected component over the vehicle wiring system or other means. CPUs transmit data received from the ignition key memory to a CCU which alters the data and transmits it back to the CPU. If data received by the CPU during the polling routine matches the data stored in the memory of the CPU, vehicle components are enabled. (Enabled means that active components are allowed to function for the operation of the vehicle.) If data sent to the CPU memory does not match what is stored, the CPU sends a command to active CCUs that disable the component and the vehicle.

The Dealer/Agent (DA) equipment interface between the data base and the vehicle is the System Control Center (SCC), which is operated and owned by DAs also provides the communications link between the vehicle CPU and the central database. The DA typically will own one to five SCCs. In addition to being the communication link between the central database and the vehicle, the SCC provides an important security element to the integrity of the data base. Important events such as resale, accidental damage, maintenance, repair, etc., are recorded in the database and can be retrieved by any authorized DA anywhere in the world. SCC equipment allow protected parts to be replaced in any country with authorized DAs. To replace a protected part, its code is entered by the database into the CPU memory.

The third major portion of the system is the International Data Base (IDB) must approve any component changes within the vehicle. IDB maintains an inventory of each protected component in vehicles, parts in dealer's stock, and factory inventory.

The IDB logically binds every protected vehicle (including each of its protected components) of particular models and model years together. A signature code (SC) address is created for each protected component of every vehicle with the Autosafe system manufactured worldwide. Consequently, there can be no resale market for stolen vehicles and components covered by the system. If not authorized by the central database, a protected part having the wrong signature code or no SC will not function nor allow the vehicle in which it is installed to function. The IDB also provides software programs necessary to maintain security integrity of the system.

The above description is a basic overview of the major systems in the subject invention. The three types of disabling schemes capable of being incorporated into the VDS will now be addressed. They are: active, logic, and passive.

In a active disabling device, components are disabled by embedding a triac or other electronic switching device within the windings of an electrical motor, alternator, or relay or in a spool of a solenoid coil that controls either a vacuum or hydraulic flow. Active refers to a CCU which controls a device performing an affirmative action such as blocking or disabling a component. Components such as the fuel injection system and transmission can be protected using an active mode disabling scheme.

An example of a logic disabling scheme would be a disruptive message send to a processor that is already controlling a component such as a distributor.

Passive disabling devices typically incorporate a CCU that becomes inoperative if the component to which the CCU is attached becomes damage. Passive disabling devices are useful for components such as bumpers, fenders and trunk lids. In a passive disabling device, a CCU is typically incorporated into large rectangular piece of a material which is affixed to the protected component and cannot be removed without destroying the CCU's electronics. For example, the protected component may be mounted upon a pad, which if damaged, will cause the CCU to indicate a problem and disable the system. Even if the would be thief knew the location of the pad and carefully cut around it, repair of the protected component would not be economically feasible.

The subject invention contemplates means to reactivate equipment components which have been disabled by commands from the CPU. For example, if a particular protected component is disabled by switching means, reactivation can be achieved by commands from the CPU. Unauthorized repair can be made difficult or impossible by, for example, encasing the protected component within a case requiring specialized tools to open. Another alternative is to equip a protected component with an electronic circuit that can be enabled or disabled by entering a unique digital code at a remote keypad. Other alternatives are, of course, also possible.

Roadside service can be accommodated by the subject system. By using a portable laptop SCC and cellular telephones, roadside service and reprogramming of the CPU to accommodate replacement parts may be accomplished. Request for database changes from a portable SCC are performed in a similar manner to that described for stationary units with the added precaution of using codes and encrypted language to eliminate the possibility of radio or wire transmission interception by unauthorized parties. Components which have been disabled by commands from the CPU can be reactivated by either a portable or a stationery SCC. For example, if a protected component is in need of a replacement because of malfunction, a new replacement part may be drawn from stock. This part already has a factory key code and a dealer code impressed on it. Both codes would be recognizable as replacement parts rather than a part in the assembled vehicle. The part is removed from the replacement part inventory of the central database and is added to the active part inventory for the vehicle in which the part is installed.

The central database will not allow a part to be added to the active vehicle part list unless a similar part is taken from a factory/dealer replacement part list. Likewise, a part cannot be taken from the factory/dealer replacement part list until a defective similar part is subtracted from a vehicle part list. By cross-checking all parts within the system, unauthorized part replacement is virtually impossible.

The subject invention includes seven major operational components which operate within the three major systems defined above:

1. Factory Code Key, a factory installed code that is impressed on ROM non-volatile memory;
2. ignition key, a combination mechanical key with the factory logic key and the operator logic key;
3. operator logic key which is erasable, programmable ROM, and non-volatile;
4. CPU, system controller in the vehicle;
5. DA module, Dealer/Agent code key and communications port in the vehicle to the SCC;
6. CCUs which contain non-volatile ROM, EPROM, and optionally, disabling device for protected component; and
7. central database which records, protects and stores the identification, location (vehicle association), and history of each protected part and vehicle.

The following description is a preferred embodiment of the invention.

Should the vehicle's power be interrupted, the system is disabled. When power is returned, a touch pad is keyed with the operator's code, and the key is turned to the "on" position. The system will then be restored to operation.

The first sequential CCU is an electronic key that opens access doors and starts the engine. The key functions to interrupt the CPU and causes the CPU to transmit a code request back to it. Stored within the ignition key, in its memory, are three key access codes one from the factory, one from the dealer, and one from the customer. The system is versatile so that if the dealer has not yet sold the vehicle, a special dealer code may be used allowing the vehicle to be started a predetermined number of times. When the key receives the message from the CPU, the logic gate having been changed by the three key codes, then changes the message and sends it back to the CPU. This handshaking" procedure activates the CPU.

The ignition key utilized by the operator contains memory (factory code (FAC) key and customer code (CC), and line drivers in its handle which can mechanically and/or logically open access doors. As the key is turned in the cylinder of the ignition locking system, it is powered sending an interrupt to the CPU.

The FAC crosschecked for duplication and stored, at the time the protected component is manufactured, in the central database. One preferred code is a 16 digit (hexadecimal) code number.

The figures depict a most preferred embodiment of the subject invention. FIG. 1 shows various components of the subject invention utilized in a motor vehicle. The CPU (1) receives the CC from the ignition key memory and transmits the CC message to each protected component, which in turn is altered by the CCU as it passes the logic gate which is controlled by the DAC and is transmitted back to the CPU for verification. The CPU "polls" each protected component of the vehicle as the key is turned in its cylinder. Polling results in a central processor verifying that each protected component has been properly authorized to be included with the vehicle being protected. If all protected components pass inspection, the system powers down until the polling sequence is reinitiated.

When access to the vehicle is required by the operator, an electric ignition key (2), is inserted into the locking receptacle (not shown). Insertion of the ignition key causes the CPU to poll the protected components including, for example the key (2), key receptacle (3), distributor (4), electric fuel injectors (5), crank shaft (6), and starter (7).

It is understood that the components described as being protected components herein are exemplary only, and that protected components in any particular piece of mobile equipment are chosen at the manufacturer's discretion. Such protected components can include electronic systems such as automobile body parts, stereos, telephones, communication systems, navigational equipment, and the alike.

The agent key module includes memory and a communication port programmable from the SCC at the agent's place of business. The agent key can be programmed to operate any particular vehicle; to allow any number of starts.

FIG. 2C shows a detailed representation of one type of electronic key (2), mechanical lock cylinder (3) and intelligent interface. More particularly, the key (2) includes an extended portion (10) in which is arranged a plurality of members (11) designed to accomplish electrical contact within receptacle (3) when the key is turned. Key receptacle (3) contains a plurality of terminals (12), such as a coded input terminal, a first and second coded output terminal, a positive voltage (B+) terminal, and ground terminal. It is understood that the CPU of the inventive system recognizes whether the key has been inserted into the ignition or into an access door of a mobile piece of equipment by recognition of a control signal coming from either the first coded output (ignition), or the second coded output (access door) in the key receptacle. Such a signal could be generated, for example, by appropriate logic circuitry incorporated into the key (2) and applied to the coded input terminal, or generated by circuitry incorporated into the key receptacle (3).

Appropriate mechanical and/or electronic means can be provided in response to the first and second coded output to operate door latches and/or energize the ignition system of the vehicle. Such means are well known in the art and will not be further described.

FIG. 2A shows a detailed representation of a second type of electronic key (2). The key includes an extended portion which is made of the same material and is fitted with key slots to actuate cylinder tumbers as in any mechanical locking system. Contacts (A&B) are positioned to provide electrical contact with a receptacle which passes a serial data stream containing the coded messages sent and received by the CPU.

The key of FIG. 2A is operated by turning 50° clockwise after insertion. This permits the key to come in contact with two conductors positioned in line with the lock cylinder so that the CPU can poll the memory in the key. The extended portion the ignition key is a mechanical key capable of operating other locks in the vehicle.

FIG. 2B shows a modified lock cylinder that links the CPU to a key such as depicted in FIG. 2A. An existing lock cylinder is utilized by modifying the key cap to allow the contacts (A and B) on the key (2) to be electrically connected to the CPU via the modified cylinder. As depicted, the cylinder housing has been modified by the addition of a power wire from the CPU and a ground wire. Other modifications include an added slip ring stator mount, and added slip ring stator, and an added slip ring slider which function to ensure alignment of the contacts on the key and housing.

Figure 3:
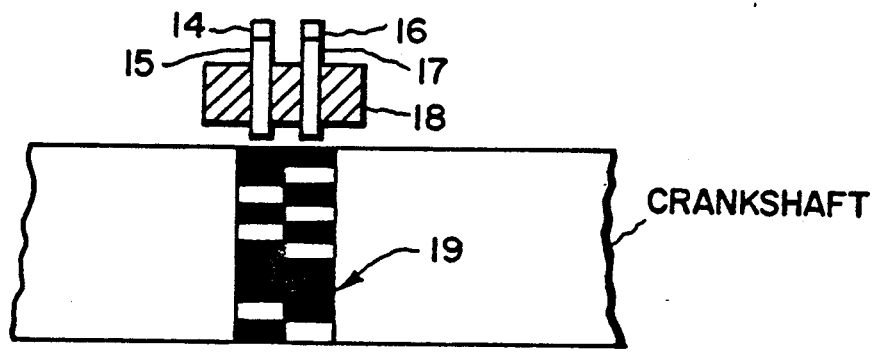
FIG. 3—Illustrates the use a reflective light interface for identifying moving parts in the subject system. In the illustration, the system is identifying the crank case of a protected vehicle.
Figure 4:
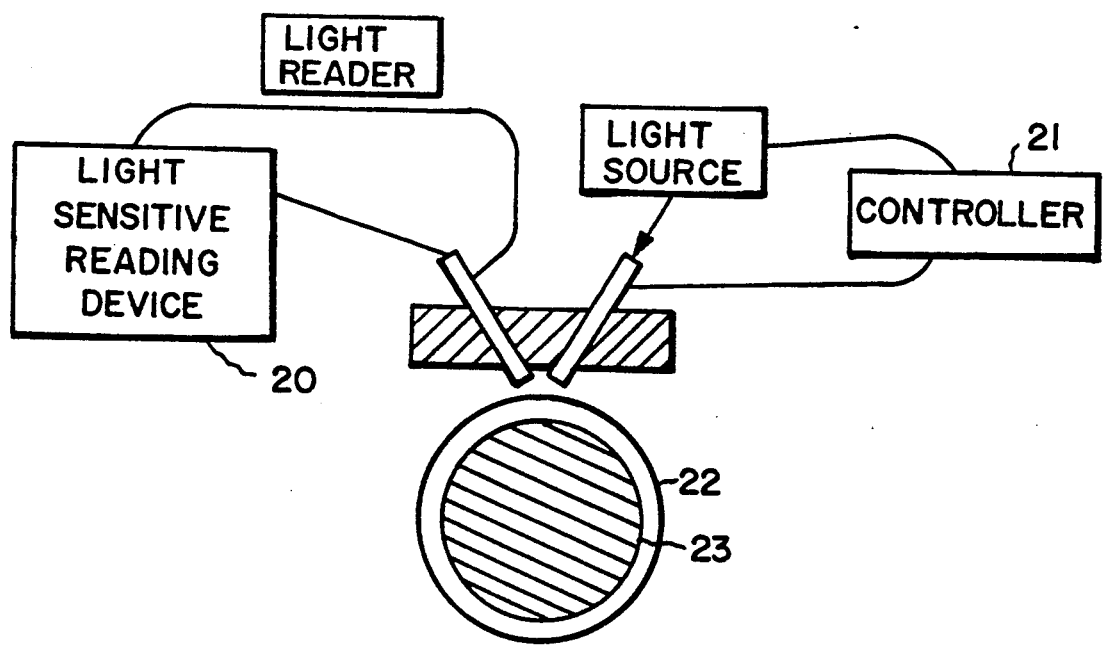
FIG. 4—illustrates a cross-sectional view of the reflective light interface depicted in FIG. 3.

FIG. 3 shows a vehicle crankshaft permanently coded with an optically reflective material (19). Although this figure illustrates the optically reflective material on the crankshaft, such a system is adaptable to any moving part. This component is verified by the CPU with a command to controller (21) [see FIG. 4] that generates beams of light (14, 16) illuminating the coded reflective strip (19).

The reflective coding strip (19) of the crankshaft alters the code returned to the CPU via a light sensitive reading device (20). As the CP1 recognizes the altered code, it verifies that the crankshaft is native to the vehicle. Components (15) and (17) are optical transmitters and receivers respectfully, while component (18) is a frame that stabilizes the various optical components. It is understood that this light reflective scheme is an example of a communication link, and other communication links to transmit information between moving parts may be incorporated in the subject invention.

Figure 5:
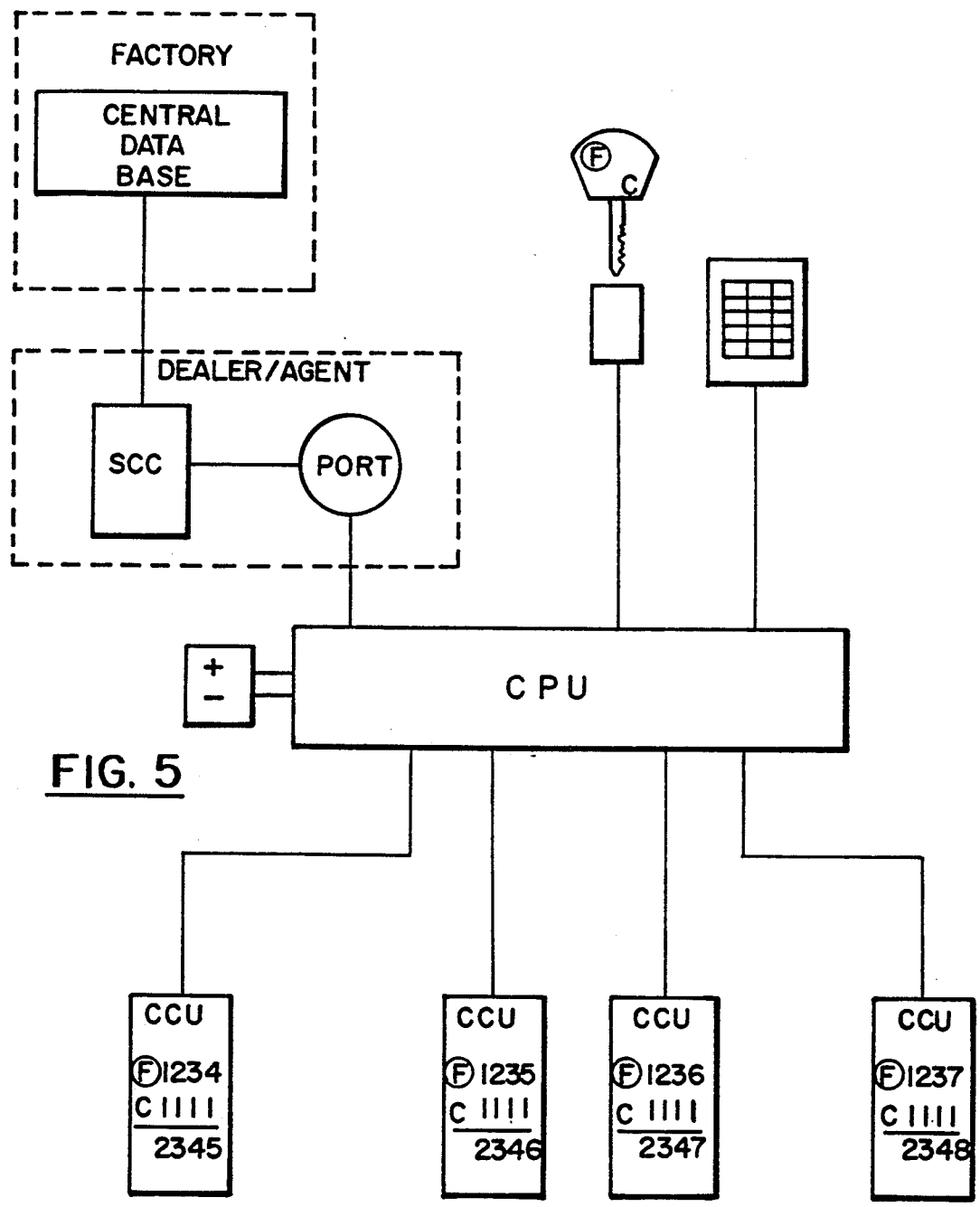
FIG. 5—Illustrates a block diagram of the subject system.

FIG. 5 shows a block diagram depicting interrelationship of the various components of the subject invention and their relationship to each other. F in a circle represents the factory code and C represents the customer code. The CPU receives the CC data from the ignition key and sends the CC to each component which then alters the code in accordance with the instructions contained in the DAC and sends a reply signal which reflects this alteration. The CPU is programmed to recognize a correct signal received from the CCU. FIG. 5 shows an embodiment where the CCU performs a simple mathematical manipulation of the code, i.e., addition of the customer code and the factory code. The CPU is programmed so that the vehicle is enabled if the correct sequences are relayed from the CCUs.

Although a specific embodiment of this invention has been shown and described, it will be understood that various modifications may be made without departing from the spirit of this invention. Accordingly, the subject invention is only to the limited by the scope of the claims and their equivalents.

What is claimed is:

1. An integrated security system for a mobile piece of equipment comprising:
    (a) a plurality of component control units each associated with a selected component of the piece of equipment, the component control units each having means for receiving a code from a central processing unit, altering the code and transmitting the altered code back to the central processing unit, and
    (b) said central processing unit located within the piece of equipment, the central processing unit having memory for each altered code for each component control unit and also having means for transmitting a code to each component control unit, and also having means for verifying the altered codes received from each component control unit as to whether they match corresponding codes in said memory, and as to whether the altered codes are received in a preset ordered sequence.

2. The security system of claim 1, wherein the component control units further includes means for disabling the component to which it is associated.

3. The security system of claim 2, wherein the central processing unit further includes means for signaling each component control unit to disable their associated component when said verifying means fails to verify said altered codes and their reception in said ordered sequence.

4. The security system of claim 1 further comprising a system control center capable of programming the central processing unit.

5. The security system of claim 4, wherein the system control center is capable of entering a new code into the central processing unit.

6. The security system of claim 4, wherein the system control center is capable of transmitting data to and receiving data from a central database.

7. The security system of claim 6 further comprising a central database capable of correlating information received from the system control center, keeping and protecting an inventory of data provided from the system control unit.

* * * * *